United States Patent
de Silva et al.

(10) Patent No.: US 12,250,179 B2
(45) Date of Patent: Mar. 11, 2025

(54) SYSTEMS AND METHODS FOR PROVIDING CROSS-MESSAGING APPLICATION CONVERSATIONS

(71) Applicant: TruVerse, Inc., Los Altos, CA (US)

(72) Inventors: Mahi de Silva, Los Altos Hills, CA (US); Manoj Malhotra, Los Altos, CA (US)

(73) Assignee: TruVerse, Inc., Los Altos, CA (US)

( * ) Notice: Subject to any disclaimer, the term of this patent is extended or adjusted under 35 U.S.C. 154(b) by 0 days.

(21) Appl. No.: 15/673,946

(22) Filed: Aug. 10, 2017

(65) Prior Publication Data

US 2018/0048594 A1 Feb. 15, 2018

Related U.S. Application Data (60) Provisional application No. 62/373,900, filed on Aug. 11, 2016.

(51) Int. Cl.
*H04L 51/18* (2022.01)
*H04L 51/02* (2022.01)
*H04L 51/56* (2022.01)

(52) U.S. Cl.
CPC .............. *H04L 51/02* (2013.01); *H04L 51/18* (2013.01); *H04L 51/56* (2022.05)

(58) Field of Classification Search
CPC ......... H04L 51/02; H04L 51/18; H04L 51/36; H04L 51/56; H04L 67/55; H04L 12/1859;

(Continued)

(56) References Cited

U.S. PATENT DOCUMENTS

| 8,000,454 | B1 | 8/2011 | Or-Bach et al. |
| 8,775,529 | B2 * | 7/2014 | Wright .................... H04L 69/08 |
| | | | 709/206 |

(Continued)

FOREIGN PATENT DOCUMENTS

| WO | WO2018005087 A1 | 1/2018 |
| WO | WO2018031765 A1 | 2/2018 |

OTHER PUBLICATIONS

Niko Nelissen, "How bot-to-bot could soon replace APIs", https://venturebeat.com/2016/06/05/how-bot-to-bot-could-soon-replace-apis/, Jun. 5, 2015.*

(Continued)

*Primary Examiner* — Messeret F Gebre
(74) *Attorney, Agent, or Firm* — Carr & Ferrell LLP (57) ABSTRACT

Systems and methods for cross-platform messaging are provided herein. An example method includes operatively coupling a first chatbot associated with a first user, a second chatbot associated with a second user, and a central messaging system. The first chatbot is associated with a first messaging application installed on a first user device. Similarly, the second chatbot is associated with a second messaging application installed on a second user device. The second messaging application may differ from the first messaging application. The method also includes receiving a message from the first chatbot and transmitting the message to the second chatbot. The message can be originally generated by the first user using the first messaging application. The method can also transmit the message to one or more additional chatbots of other users. Once delivered, the message is provided by a corresponding chatbot to the messaging application for presentation to the user.

17 Claims, 4 Drawing Sheets

(58) Field of Classification Search
CPC ... H04L 47/622; H04L 51/216; H04L 67/562; H04L 51/046; H04L 51/063; H04L 51/066
USPC .......................................................... 709/204
See application file for complete search history.

(56) References Cited

U.S. PATENT DOCUMENTS

| | | | |
|---|---|---|---|
| 9,100,478 B1 | 8/2015 | Benway et al. | |
| 9,948,778 B2 | 4/2018 | de Silva et al. | |
| 10,708,216 B1 | 7/2020 | Rao | |
| 11,175,792 B2 | 11/2021 | de Silva et al. | |
| 2004/0117444 A1* | 6/2004 | Goodman | H04L 51/04 709/204 |
| 2006/0026254 A1* | 2/2006 | Kessen | H04L 51/04 709/207 |
| 2008/0147406 A1* | 6/2008 | Da Palma | G10L 15/22 704/260 |
| 2009/0181702 A1* | 7/2009 | Vargas | H04L 51/14 455/466 |
| 2010/0287226 A1* | 11/2010 | Wright | H04L 51/36 709/202 |
| 2010/0296638 A1 | 11/2010 | Wang | |
| 2012/0059896 A1 | 3/2012 | Li | |
| 2012/0209673 A1 | 8/2012 | Park | |
| 2013/0030993 A1 | 1/2013 | Peace et al. | |
| 2013/0073636 A1* | 3/2013 | Zhu | H04L 12/1818 709/206 |
| 2014/0122053 A1 | 5/2014 | Lotan et al. | |
| 2014/0122407 A1 | 5/2014 | Duan | |
| 2014/0164953 A1* | 6/2014 | Lynch | H04L 51/046 715/753 |
| 2014/0244712 A1* | 8/2014 | Walters | G06Q 30/02 709/202 |
| 2014/0279050 A1 | 9/2014 | Makar et al. | |
| 2015/0172463 A1 | 6/2015 | Quast et al. | |
| 2015/0186156 A1* | 7/2015 | Brown | G06Q 10/10 715/706 |
| 2015/0215455 A1* | 7/2015 | Perotti | H04M 3/493 379/88.01 |
| 2015/0249629 A1* | 9/2015 | Denenberg | H04L 67/42 455/422.1 |
| 2016/0094492 A1 | 3/2016 | Li et al. | |
| 2016/0094507 A1 | 3/2016 | Li et al. | |
| 2016/0149839 A1* | 5/2016 | Yi | H04L 67/1095 709/206 |
| 2016/0360037 A1 | 12/2016 | Van Rensburg et al. | |
| 2017/0230312 A1* | 8/2017 | Barrett | H04L 51/02 |
| 2017/0358299 A1* | 12/2017 | Schlesinger | G06Q 10/10 |
| 2017/0374198 A1 | 12/2017 | de Silva et al. | |
| 2018/0025726 A1* | 1/2018 | Gatti de Bayser | G10L 15/22 704/257 |
| 2018/0027395 A1* | 1/2018 | Gupta | H04W 4/14 455/466 |
| 2018/0063070 A1* | 3/2018 | Zucker | H04L 51/56 |
| 2018/0219921 A1 | 8/2018 | Baer et al. | |
| 2018/0343214 A1* | 11/2018 | Shen | H04L 51/36 |
| 2019/0087707 A1 | 3/2019 | Cummins | |
| 2020/0044998 A1 | 2/2020 | Jeon | |
| 2020/0285372 A1 | 9/2020 | de Silva et al. | |
| 2022/0066624 A1 | 3/2022 | de Silva et al. | |

OTHER PUBLICATIONS

R. Costa, "VADM—A common API for agnostic application development within VANETs," Proceedings ELMAR-2013, Zadar, Croatia, 2013, pp. 365-368. (Year: 2013).*

Chohan, N., Bunch, C., Krintz, C., & Nomura, Y. (2011). Database-agnostic transaction support for cloud infrastructures doi:http://dx.doi.org/10.1109/CLOUD.2011.111 (Year: 2011).*

F. Nack, "Social Compatibility," in IEEE MultiMedia, vol. 17, No. 3, pp. 4-7, Jul.-Sep. 2010 (Year: 2010).*

N. Unger et al., "SoK: Secure Messaging," 2015 IEEE Symposium on Security and Privacy, San Jose, CA, USA, 2015, pp. 232-249, doi: 10.1109/SP.2015.22. (Year: 2015).*

International Search Report and Written Opinion of the International Search Authority mailed Jul. 6, 2017 in Patent Cooperation Treaty Application No. PCT/US2017/037349, filed Jun. 13, 2017, 12 pages.

De Silva, Mahi et al., "Automated Use of Interactive Voice Response Systems," U.S. Appl. No. 15/271,201, filed Sep. 20, 2016 Specification, Claims, Abstract, and Drawings, 32 pages.

International Search Report and Written Opinion of the International Search Authority mailed Oct. 17, 2017 in Patent Cooperation Treaty Application No. PCT/US2017/046288, filed Aug. 10, 2017, 9 pages.

* cited by examiner

SYSTEMS AND METHODS FOR PROVIDING CROSS-MESSAGING APPLICATION CONVERSATIONS

CROSS-REFERENCE TO RELATED APPLICATIONS

This nonprovisional patent application claims the benefit and priority of U.S. Provisional Application Ser. No. 62/373,900, filed on Aug. 11, 2016, which is incorporated herein by reference in its entirety, including all references and appendices cited therein.

FIELD OF THE INVENTION

The present technology is generally directed to electronic messaging. More particularly, the present technology is directed to systems and methods for providing cross-platform messaging between two or more users. The present technology employs a central messaging system that operatively couples two or more chatbots enabling cross-platform messaging between the users.

BACKGROUND

The rise in popularity of messaging applications, such as Facebook° Messenger, Whatsapp®, Snapchat®, Slack®, WeChat®, Twitter®, Skype®, iMessage®, Android® Messager, and many others, is creating "islands" of communications and "walled gardens" for conversational commerce. The versatility of messaging applications and related communications services gives rise to new message formats which are often not compatible with one another. That is, each messaging application is separate and isolated, such that users of one messaging application cannot interact or message users of any other messaging application. For example, when a first user wants to send a message to a second user using a first messaging application (e.g., Facebook® Messenger), the first user may find that the message cannot be sent to the second user because the second user is using a second messaging application (e.g., Whatsapp®) rather than the first application (e.g., Facebook® Messenger).

In addition, voice services and virtual assistants, such as Amazon Alexa® or Apple's Siri®, are also separated from certain messaging applications. In other words, a virtual assistant may support and facilitate messaging via a limited number of messaging applications. Incompatibility between virtual assistants and messaging applications can substantially limit the value and applicability of virtual assistants.

SUMMARY

According to some embodiments, the present disclosure is directed to a communication method for cross-platform messaging. An example method comprises operatively coupling a first chatbot associated with a first user, a second chatbot associated with a second user, and a central messaging system; receiving a message from the first chatbot, the first chatbot being associated with a first messaging application; and transmitting the message to the second chatbot, the second chatbot being associated with a second messaging application that is different from the first messaging application.

The method can also include operatively coupling a third chatbot with the first chatbot, the second chatbot, and the central messaging system, in which the third chatbot is associated with a third user; and transmitting the message to the third chatbot, the third chatbot being associated with the third messaging application that is different from both the first messaging application and the second messaging application. Accordingly, the method can enable two or more users to send messages to one another via two or more chatbots.

The present technology is also directed to a cross-platform messaging system and a non-transitory processor-readable medium, which are configured to implement the above-indicated method for cross-platform messaging.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally, the present technology is directed to cross-platform messaging designed to overcome drawbacks known in the art. Particularly, the present technology facilitates receiving, processing, and transmitting messages between two or more messaging applications that may be incompatible with one another. For example, the present technology enables a first user using a first messaging application (such as Facebook® Messenger) to exchange messages with a second user using a second messaging application (such as Whatsapp® Messenger). The technology can also provide messaging between three or more users. Moreover, the present technology facilitates integration of user messaging and communications with one or more virtual assistants (e.g., chatbots) that can generate automated messages and implement certain actions in response to user requests.

According to various embodiments of this disclosure, a cross-platform messaging system includes a central messaging system, such as a cloud-based or server-based service that integrates or operatively connects two or more chatbots. Each of the chatbots can be associated with a particular user. Users can utilize user devices, such as smartphones, that have messaging applications. The messaging applications can be installed on the user devices.

Alternatively, the messaging applications can be web services such that the user devices can be used to access the messaging applications, for example, via a browser. In addition, each of the chatbots can be associated with one or more messaging applications of a certain user. For example, the chatbots can be installed or integrated into the messaging applications or the chatbots can be operatively connected with the messaging applications. Furthermore, the chatbots can be associated with the messaging applications but provided in the central messaging platform or via another web service. In general, the central messaging platform is responsible for data transmission between the chatbots.

In an example embodiment, the cross-platform messaging system operatively couples together the central messaging system, a first chatbot associated with a first user, a second chatbot associated with a second user, and optionally one or more additional chatbots associated with other users (if any). As mentioned above, the first chatbot can be associated with a first messaging application, the second chatbot can be associated with a second messaging application, and other chatbots can be respectively associated with other messaging applications. The first messaging application can be associated with the first user and available via a first user device. Similarly, the second messaging application can be associated with the second user and available via a second user device, and other messaging applications can be respectively associated with other users and available via other user devices. Notably, the second messaging application can differ from the first messaging application and, optionally, differ from said other messaging applications (if any).

Furthermore, in the example embodiment, the first user can generate a first message via the first messaging application. The first message can include a text message, symbol, emoji, image, video, audio, voice, or any combination thereof. The first message can be intended for delivery to the second user and, optionally, other users. Accordingly, the first messaging application can provide the first message to the first chatbot. The first chatbot can process the first message to determine addressees (e.g., identifiers of intended users) or other criteria (e.g., the first chatbot can determine whether an automated response is needed by the first chatbot rather than just a transmission of the first message). If the addressees (or the identifiers) are determined, the first chatbot can transmit the first message to the second chatbot and, optionally, to other chatbots if there are two or more addressees.

When the second chatbot receives the first message, the second chatbot can provide it to the second messaging application which then presents the first message to the second user. Similarly, if there are two or more addressees, each of the chatbots provides the first message to respective messaging applications for communicating the first message to all designated users. The process can be repeated substantially in the same manner by the first user, the second user, and any other user engaged in the cross-platform communications.

Each of the chatbots can interact with one another and transmit operative information, contact information, or the like to enable the cross-platform communications. Moreover, each of the chatbots can generate automated responses to user messages or requests. For example, the first user can commence communication with the first chatbot by indicating that the first user wants to send a message to the second user. The first user can communicate with the first chatbot using natural language and the first chatbot can apply natural processing algorithms and artificial intelligence algorithms (e.g., neural networks) to recognize first user requests. In response to an inquiry of the first user, the first chatbot can retrieve contact information of the second user from the first user device and look up data relating to the second user in the central messaging platform. Based on the data relating to the second user in the central messaging platform, the first chatbot can establish operative communications with the second chatbot of the second user in order to enable an exchange of messages between the second user and the first user via the first and second chatbots.

The following detailed description of embodiments includes references to the accompanying drawings, which form a part of the detailed description. Anything described in the "Detailed Description" section shall not be treated as prior art to the claims and is not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The embodiments of this disclosure may be implemented with a "computer" or "computing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in the embodiments of this disclosure, the methods, algorithms, and functions may be implemented in hardware, software, or any combination thereof. If implemented in software, the methods, algorithms, and functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." It should be also understood that the terms "first," "second," "third," and so forth can be used herein to describe various elements. These terms are used to distinguish one element from another, but not to imply a required sequence of elements. For example, a first element can be termed a second element, and, similarly, a second element can be termed a first element, without departing from the scope of present teachings.

The term "user device" shall mean any electronic device with input and output capabilities allowing receiving and sending messages. Some examples of the electronic device include a mobile device, cellular phone, mobile phone, smartphone, tablet computer, laptop computer, desktop computer, Internet phone, netbook, personal digital assistant, portable computing device, television system, and so forth.

The term "message" shall mean an electronic communication bearing conversational data thereon including text, images, video, audio, voice, or any combinations thereof. Some examples of "messages" include short messages (SMS), multimedia messages (MMS), e-mails, chat messages, pop-up messages, or any other messages created by or suitable for messaging applications such as Facebook® Messenger, Whatsapp®, Snapchat®, Slack®, WeChat®, Twitter®, Skype®, iMessage®, Android® Messenger, and so forth.

The term "chatbot" shall mean a software agent or robot or bot that is configured to engage in conversations with a user, receive messages, transmit messages, and interact with other chatbots or predefined web services. The chatbot may use artificial intelligence algorithms based on, for example, neural networks to provide a human-centric interface for accessing, processing, managing, and delivering information. As such, the term "chatbot" may refer to one or more of the following: virtual assistant, conversational agent, chatter robot, chatterbot, dialog system, chat agent, digital personal assistant, automated online assistant, and the like.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

Figure 1:
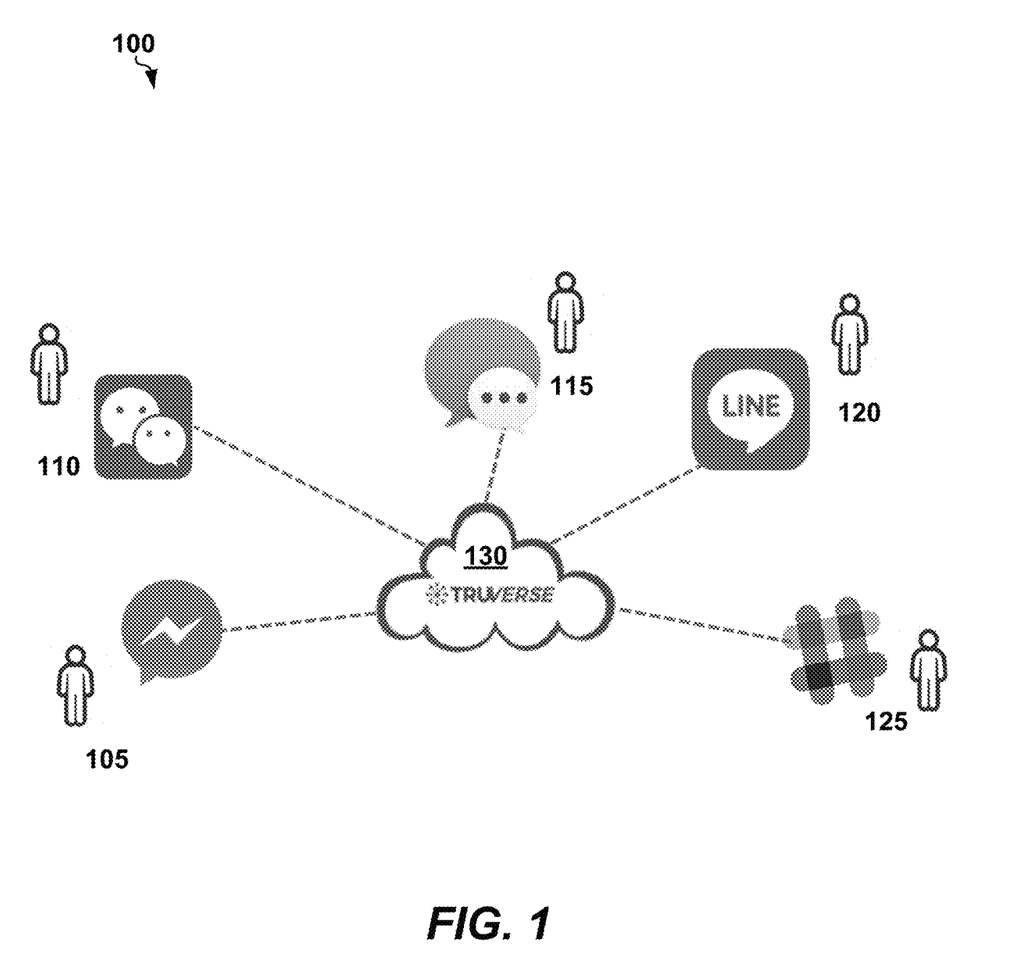
FIG. 1 is a schematic diagram of a cross-platform messaging system, according to an example embodiment.

FIG. 1 is a schematic diagram of an example cross-platform messaging system 100 that illustrates aspects of the present disclosure. Cross-platform messaging system 100 comprises a central messaging system 130 that enables transmission of messages between various messaging applications 105 through 125, which are utilized by different users. Central messaging system 130 employs or communicates with chatbots, each of which is associated with respective messaging applications 105 through 125. Effectively, the present technology allows, for example, a first user using a first messaging application 105 to send one or more messages to one or more users using other messaging applications 110-125, and vice versa.

Figure 2:
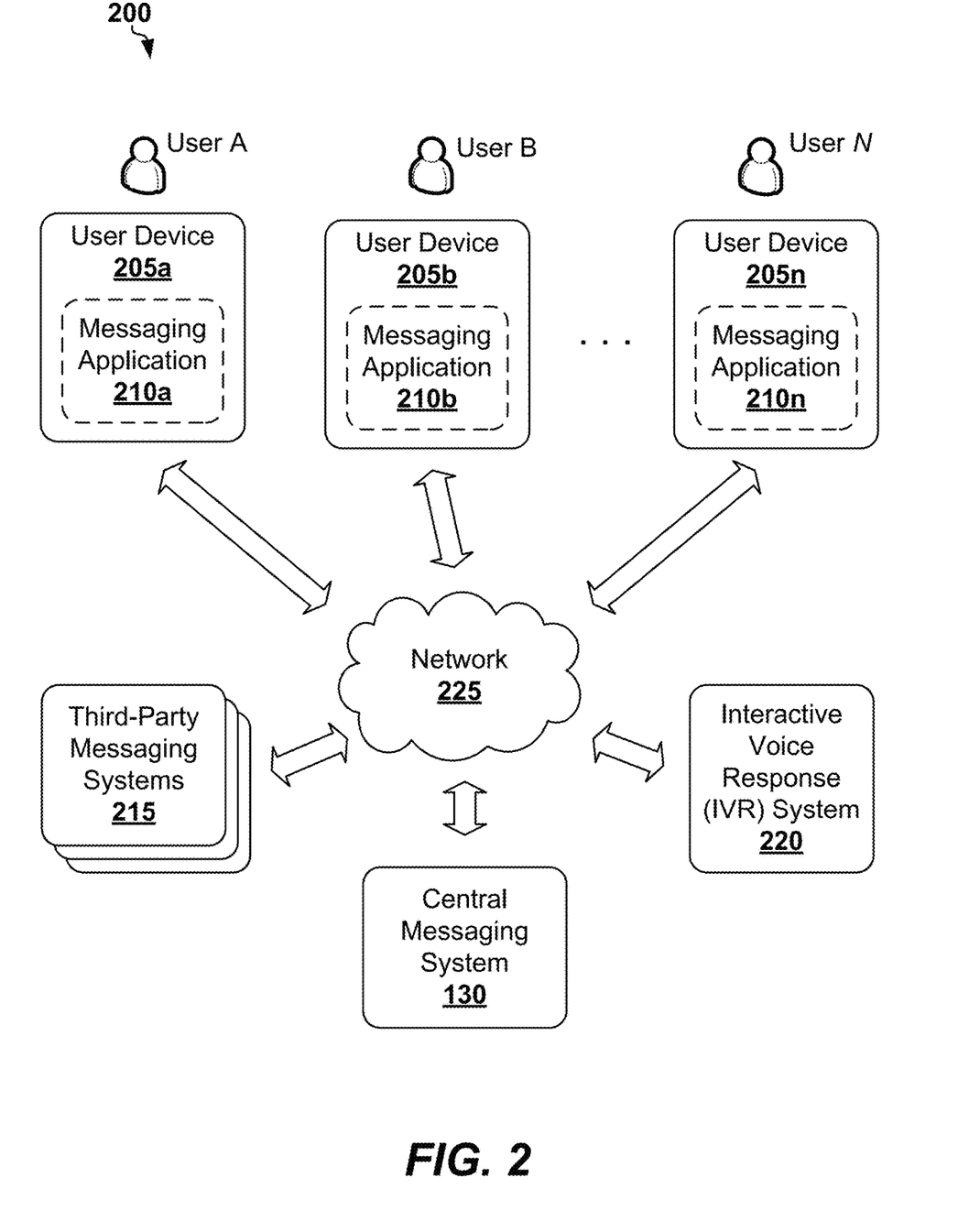
FIG. 2 is a detailed diagram of the cross-platform messaging system, according to an example embodiment.

FIG. 2 is a more detailed schematic diagram of an example cross-platform messaging system 200 that is suitable to practice embodiments of the present disclosure. As shown in FIG. 2, there is provided a central messaging system 130 that can run on one or more servers and be generally available as a web service via the Internet. There is also a plurality of user devices 205a-205n, where n is at least two. Each of user devices 205a-205n is used by respective user A, user B, and so forth. Furthermore, each of the user devices 205a-205n has access to, or has installed on it, one or more messaging applications. For example, user device 205a has installed on, has access to, or is associated with, a messaging application 210a. User device 205b has installed on, has access to, or is associated with, a messaging application 210b. Similarly, user device 205n has installed on, has access to, or is associated with, a messaging application 210n. A user/user device (e.g., user C/user device 205c) need not be inside a messaging application (e.g., 210c) to communicate with each of the messaging systems and associated users. Each of the messaging applications 210a-210n is associated with a chatbot (not shown). The chatbot can be provided by central messaging system 130 or integrated into the messaging applications 210a-210n, depending on implementation.

The chatbots can include Application Program Interfaces (API) allowing them to be coupled to one or more messaging applications 210a-210n. The chatbot APIs can also be in communication via central messaging system 130. In one or more embodiments, central messaging system 130 can receive a message from user A on the first messaging application (e.g., messaging application 210a) through the first chatbot. Central messaging system 130 can then transmit the message to user B on the second messaging application (e.g., messaging application 210b) through the second chatbot. It should be understood that, in one or more embodiments, communications between the first messaging application and the second messaging application are secure and encrypted. Additionally, communications between the first chatbot and the second chatbot are secure and encrypted.

Cross-platform messaging system 200 can also be connected to one or more third-party messaging systems 215 if any of the messaging applications 210a-210n are operative only via third-party messaging systems 215. As such, messages between the users can also go through third-party messaging systems 215 if needed.

Cross-platform messaging system 200 can also be connected or employ an interactive voice response (IVR) system 220, which can be designed to enable users to communicate with enterprises using a telephone keypad or by speech recognition. The chatbots can be integrated into the IVR system 220. Additional aspects of IVR system 220 and its integration with the chatbots are disclosed in co-pending U.S. Nonprovisional patent application Ser. No. 15/271,201, filed on Sep. 20, 2016, and entitled "Automated Use of Interactive Voice Response Systems," which is incorporated herein by reference in its entirety for all purposes.

Still referring to FIG. 2, the shown elements of cross-platform messaging system 200 can be coupled via one or more communication networks 225, which can include wired, wireless, optical, or any other communications networks suitable for digital and analog data transfer. Example networks 225 may include or interface with any one or more of, for instance, the internet, a local intranet, a Personal Area Network (PAN), a Local Area Network (LAN), a Wide Area Network (WAN), a Metropolitan Area Network (MAN), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, Digital Subscriber Line (DSL) connection, an Ethernet connection, an Integrated Services Digital Network (ISDN) line, a dial-up port such as a V.90, V.34 or V.34b is analog modem connection, a cable modem, an Asynchronous Transfer Mode (ATM) connection, or a Fiber Distributed Data Interface (FDDI) or Copper Distributed Data Interface (CDDI) connection. Furthermore, communications may also include links to any of a variety of wireless networks, including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), Cellular Digital Packet Data (CDPD), Research in Motion (RIM), 4G LTE (long-term evolution and similar networks), Limited duplex paging network, Bluetooth radio, or an IEEE 802.11-based radio frequency network. Networks 225 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

As explained above, two or more users can communicate with cross-platform messaging system 200 using different messaging applications. Example communications may take place as follows. User B installs a second chatbot via messaging application 210b. The second chatbot proceeds to request contact information for user A and requests that user A selects a desired messaging application via user device 205a. Central messaging system 130 can generate a first chatbot with a deep link to allow user A to add the first chatbot to messaging application 210a or another selected messaging application. Central messaging system 130 then can transmit information related to the first chatbot to the second chatbot. Thereafter, user A can generate messages and transmit them to the second user through messaging application 210a, via the first chatbot, central messaging system 130, the second chatbot, and finally, to messaging application 210b, and the other direction as well. In one or more embodiments, the first chatbot is associated with user B using at least one of a name, an avatar, or other suitable user identification. Similarly, the second chatbot can be associated with user A using at least one of a name, an avatar, or other suitable user identification.

In various embodiments, cross-platform messaging system 200 employs methods for facilitating multi-party conversations. Regardless of whether the underlying messaging applications 210a-210n support multi-party conversations, or conversations having more than two users, cross-platform messaging system 200 enables users of different messaging applications 210a-210n to have multi-party conversations. A third user (e.g., user N) can be added to the conversation between user A and user B via a third messaging application (e.g., messaging application 210n) and a third chatbot. Central messaging system 130 can associate the first chatbot, the second chatbot, and the third chatbot with a first multi-party conversation. When a user associated with the group of users comprising the first user, the second user, and the third user, messages the chatbot of the user, the chatbot can transmit the message to central messaging system 130, which can, in turn, transmit the message to the remaining chatbots. Thus, the remaining users can receive the message via their respective chatbots. It should be understood that some messaging applications can be the same messaging application or all messaging applications can be different.

Furthermore, in some example embodiments, cross-platform messaging system 200 comprises one or more commercial chatbots associated with an enterprise that interact with users and other chatbots as described in the present disclosure. For example, a flight information commercial chatbot may provide information regarding the flight of a user, including the flight number, departure and arrival times, delays, and so forth, to the recipients of a cross-platform messaging conversation by connecting to a public web interface of the enterprise or a public toll-free IVR system (such as IVR system 220).

Furthermore, in some embodiments, the chatbots can receive an address book of a user including one or more contacts, each having contact information of some other users. The chatbot can send the contact information to a cloud service or central messaging system 130, which generates a set of invitations and sends each invitation to the one or more contacts. In certain embodiments, the central messaging system 130 determines a set of contacts that have messaging applications (e.g., messaging applications 210a-210n) different from the messaging application (e.g., messaging applications 210a-210n) the user, and then generates and sends invitations for that set of contacts. In various embodiments, central messaging system 130 determines a set of contacts that have chatbots associated with different messaging applications. The cloud service transmits a list of the chatbots to the user. The user then selects one or more chatbots to initiate a conversation, and the cloud service generates a conversation between different messaging applications as described in the present disclosure.

In other embodiments, the chatbots communicate with other chatbots without user involvement in real time. In one example, in response to receiving a message, a chatbot is configured to automatically transmit a response message indicating that the associated user is currently unavailable. In another example, each chatbot is in communication with a respective calendar application of the user, and computes the availability of each respective user for a meeting on a particular date and time. In a further example, each chatbot can be configured to negotiate availability using a natural language processing (NLP) interface. In various embodiments, the chatbots, as described in the present disclosure, comprise one or more Artificial Intelligence (AI) modules, Neural Net, and NLP engines. The cloud service or central messaging system 130 may facilitate payments between users of various commercial systems and employ one or more security or authentication systems. In other embodiments, the chatbots can communicate with location and proximity systems on a user device (e.g., user devices 205a-205n) of the user.

Figure 3:
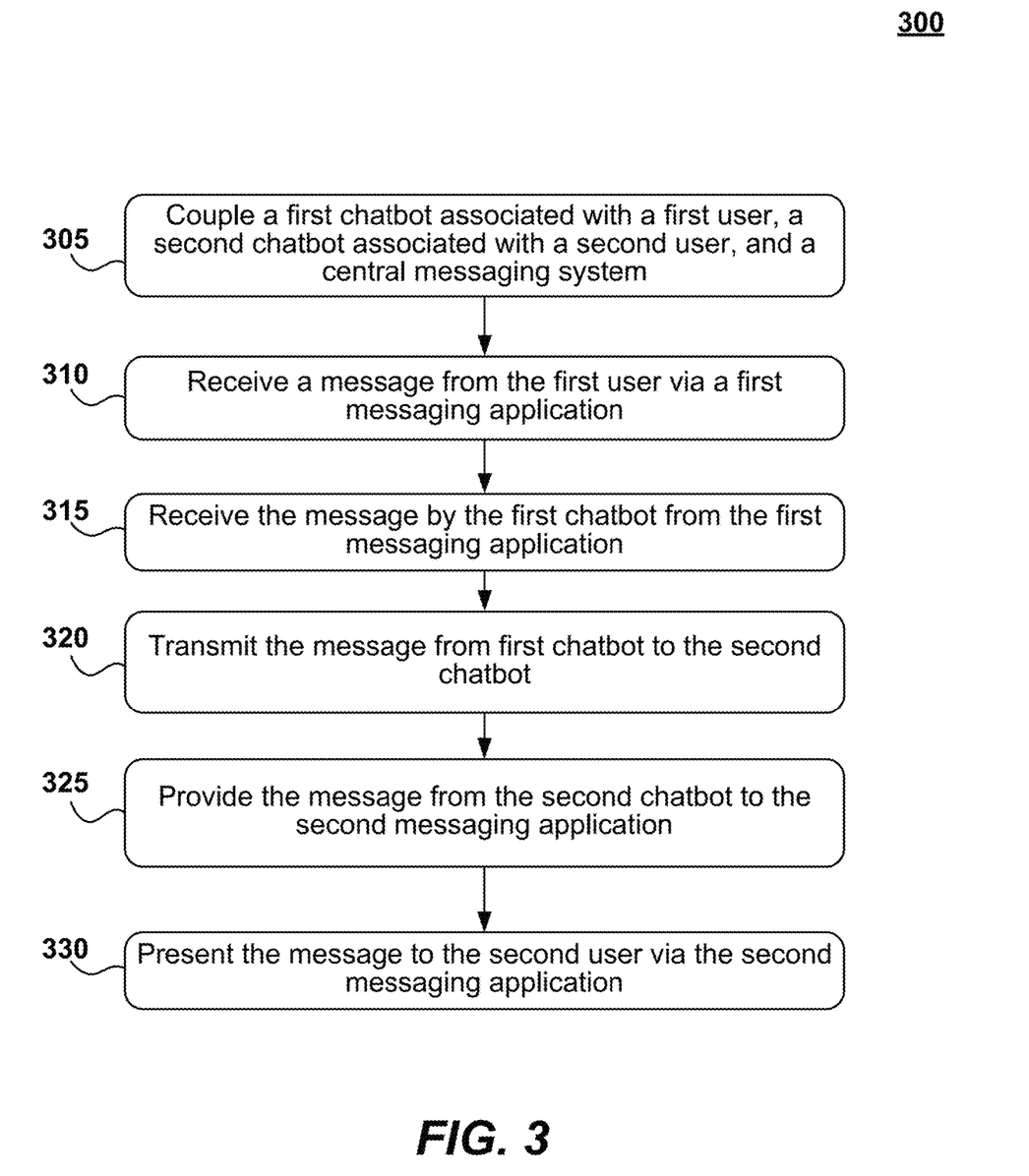
FIG. 3 is a flowchart of an example method of the present disclosure, according to an example embodiment.

FIG. 3 is a process flow diagram showing a method 300 for cross-platform messaging according to an example embodiment. Method 300 can be performed by processing logic that may comprise hardware (e.g., decision-making logic, dedicated logic, programmable logic, application-specific integrated circuit (ASIC), and microcode), software (such as software run on a general-purpose computer system or a dedicated machine), or a combination of both. In one example embodiment, the processing logic refers to cross-platform messaging system 200 or its elements such as central messaging system 130. Recited operations of method 300 below may be implemented in an order different than described and shown in the figure. Moreover, method 300 may have additional operations not shown herein, but which may be evident to those skilled in the art from the present disclosure. Method 300 may also have fewer operations than outlined below and shown in FIG. 3.

Method 300 can commence at operation 305 with cross-platform messaging system 200 operatively coupling a first chatbot associated with a first user (e.g., user A), a second chatbot associated with a second user (e.g., user B), and central messaging system 130. The first messaging application can be provided on a first user device (e.g., a user device 205a) of the first user and the second messaging application can be provided on a second user device (e.g., a user device 205b) of the second user.

In some embodiments, method 300 can include transmitting information relating to the first chatbot to the second chatbot in order to program the first chatbot, and transmitting information relating to the second chatbot to the first chatbot in order to program the second chatbot so as to enable the first user and the second user to send messages to one another via the first chatbot and the second chatbot. Notably, the first chatbot can be associated with the second user using at least a second user identifier (e.g., a name or a nickname) and a second user avatar. Similarly, the second chatbot can be associated with the first user using at least a first user identifier (e.g., a name or a nickname) and a first user avatar.

At operation 310, a first messaging application (e.g., messaging application 210a) receives a message from the first user (i.e., user A). The message can include a text or multimedia message addressed to the second user (i.e., user B). The message can be generated via a graphical user interface of the first user device.

At operation 315, the first chatbot receives the message from the first messaging application. The first chatbot can be installed on or be otherwise associated with the first messaging application. In other embodiments, the first chatbot can be installed on central messaging system 130. Similarly, the second chatbot can be installed on or otherwise associated with the second messaging application. In other embodiments, the second chatbot can be installed on central messaging system 130.

In some embodiments, operation 315 can include retrieving, by the first chatbot, contact information of the second user from the first user device. Based on the contact information of the second user device, the first chatbot can prompt the second user to select a desired messaging application to communicate with the first user via the first chatbot and the second chatbot.

At operation 320, the first chatbot transmits the message to the second chatbot directly or via central messaging system 130. At operation 325, the second chatbot provides the message to the second messaging application. At operation 330, the second messaging application can provide the message to the second user via the second messaging application (e.g., via a graphical user interface of the second user device).

Operations 305-330 can be repeated by the first chatbot or the second chatbot to allow both the first and second user to exchange messages. Operations 305-330 can be also repeated with respect to one or more additional users using one or more additional chatbots. In addition, and as indicated above, at least one of the first chatbot and the second chatbot is configured to generate automated answers to user requests using natural language processing. Moreover, at least one of the first chatbot and the second chatbot is configured to generate automated answers to user requests using a public web interface or IVR system. As such, any chatbot can generate a response to the message without direct user instructions and transmit the response by this chatbot to another chatbot for further presenting to one or more users.

Figure 4:
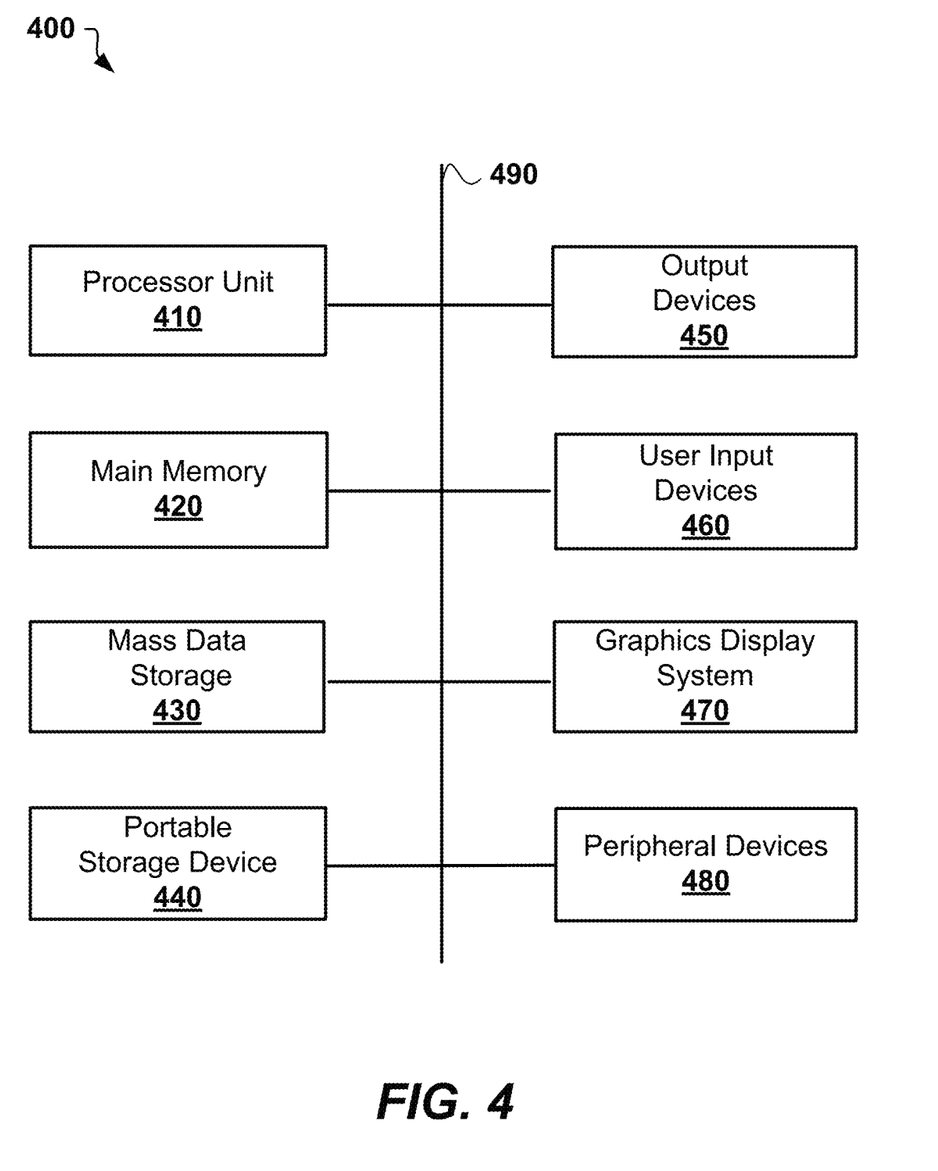
FIG. 4 is an example computing device that can be used to practice aspects of various embodiments of the disclosure.

FIG. 4 illustrates an exemplary computer system 400 that may be used to implement some embodiments of the present technology. Computer system 400 may be implemented in the contexts of the likes of computing systems such as central messaging system 130 or user devices 205. Computer system 400 includes one or more processor units 410 and main memory 420. Main memory 420 stores, in part, instructions and data for execution by processor units 410. Main memory 420 stores the executable code when in operation, in this example. Computer system 400 further includes a mass data storage 430, portable storage device 440, output devices 450, user input devices 460, a graphics display system 470, and peripheral devices 480.

The components shown in FIG. 4 are depicted as being connected via a single bus 490. The components may be connected through one or more data transport means. Processor unit 410 and main memory 420 is connected via a local microprocessor bus, and the mass data storage 430, peripheral device(s) 480, portable storage device 440, and graphics display system 470 are connected via one or more input/output (I/O) buses.

Mass data storage 430, which can be implemented with a magnetic disk drive, solid state drive, or an optical disk drive, is a non-volatile storage device for storing data and instructions for use by processor unit 410. Mass data storage 430 stores the system software for implementing embodiments of the present disclosure for purposes of loading that software into main memory 420.

Portable storage device 440 operates in conjunction with a portable non-volatile storage medium, such as a flash drive, floppy disk, compact disk, digital video disc, or USB storage device, to input and output data and code to and from computer system 400. The system software for implementing embodiments of the present disclosure is stored on such a portable medium and input to computer system 400 via portable storage device 440.

User input devices 460 can provide a portion of a user interface. User input devices 460 may include one or more microphones, an alphanumeric keypad, such as a keyboard, for inputting alphanumeric and other information, or a pointing device, such as a mouse, a trackball, stylus, or cursor direction keys. User input devices 460 can also include a touchscreen. Additionally, computer system 400 includes output devices 450. Suitable output devices 450 include speakers, printers, network interfaces, and monitors.

Graphics display system 470 include a liquid crystal display (LCD) or other suitable display device. Graphics display system 470 is configurable to receive textual and graphical information and processes the information for output to the display device. Peripheral devices 480 may include any type of computer support device to add additional functionality to the computer system.

The components provided in computer system 400 are those typically found in computer systems that may be suitable for use with embodiments of the present disclosure and are intended to represent a broad category of such computer components that are well known in the art. Thus, computer system 400 can be a personal computer (PC), hand held computer system, telephone, mobile computer system, workstation, tablet computer, mobile phone, server, mini-computer, mainframe computer, wearable computer, or any other computing system. The computer may also include different bus configurations, networked platforms, multi-processor platforms, and the like.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, computing system 400 may be implemented as a cloud-based computing environment, such as a virtual machine operating within a computing cloud. In other embodiments, computing system 400 may itself include a cloud-based computing environment, where the functionalities of the computing system 400 are executed in a distributed fashion. Thus, computing system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as computing device 400, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A communication method for cross-platform messaging, the method comprising:

operatively coupling a first chatbot associated with a first user, wherein the first chatbot uses a neural network to recognize a request from the first user, a second chatbot associated with a second user, and a central messaging system;

receiving a message from the first chatbot, the first chatbot being associated with a first messaging application;

transversing an interactive voice response (IVR) system using the first chatbot;

determining, via the first chatbot, a menu structure of the IVR system using audio processing, the menu structure comprising selectable telephonic options for each level and selection of the menu structure, the first chatbot being configured to periodically initiate a call to the IVR system and update the menu structure;

storing the menu structure in a database;

receiving a request to establish a telecommunications session from the first messaging application on a client device, the request comprising a task;

determining, via natural language parsing, the task from the request;

creating, based on the determining the task, an instruction set;

executing, based on the instruction set, the task against the menu structure by the first chatbot entering the selectable telephonic options;

transmitting the message to the second chatbot, the second chatbot being associated with a second messaging application that is different from the first messaging application;

transmitting the message to the second chatbot, the second chatbot being associated with a second messaging application that is incompatible with the first messaging application;

transmitting information relating to the first chatbot to the second chatbot to program the first chatbot;

transmitting information relating to the second chatbot to the first chatbot to program the second chatbot to enable the first user and the second user to send messages to one another via the first chatbot and the second chatbot;

automatically generating a response to the message from the first chatbot by the second chatbot without direct user instructions in real time;

wherein the response is indicative of availability of the second user based on each chatbot negotiating, using natural language processing, availability of users for a meeting on a particular data and time using a calendar application and using location and proximity systems of the users; and transmitting the response by the second chatbot to the first chatbot for further presenting to the first user.

2. The method of claim 1, in which the first messaging application is provided on a first user device of the first user and the second messaging application is provided on a second user device of the second user.

3. The method of claim 1, in which the first chatbot is installed on the first messaging application or the second chatbot is installed on the second messaging application.

4. The method of claim 1, in which the first chatbot is installed on the first messaging application and the second chatbot is installed on the second messaging application.

5. The method of claim 1, in which the first chatbot is installed on the central messaging system or the second chatbot is installed on the central messaging system.

6. The method of claim 1, in which the first chatbot is installed on the central messaging system and the second chatbot is installed on the central messaging system.

7. The method of claim 1, further comprising:
retrieving, by the second chatbot, contact information of the first user from a second user device; and
based on the contact information of the first user, prompting the first user to select a desired messaging application to communicate with the second user via the first chatbot and the second chatbot.

8. The method of claim 1, in which the receiving of the message from the first chatbot further comprises receiving the message from the first user via the first messaging application.

9. The method of claim 1, in which the transmitting of the message to the second chatbot further comprises providing the message to the second user via the second messaging application.

10. The method of claim 1, further comprising:
receiving a second message from the second user via the second messaging application;
obtaining the second message by the second chatbot;
transmitting the second message by the second chatbot to the first chatbot; and
presenting, by the first chatbot, the second message to the first user via the first messaging application.

11. The method of claim 1, in which the first chatbot is associated with the second user using at least a second user identifier and a second user avatar, and in which the second chatbot is associated with the first user using at least a first user identifier and a first user avatar.

12. The method of claim 1, further comprising:
operatively coupling a third chatbot with the first chatbot, the second chatbot, and the central messaging system, in which the third chatbot is associated with a third user; and
transmitting the message to the second chatbot and the third chatbot, the third chatbot associated with the third messaging application different from both the first messaging application and the second messaging application.

13. The method of claim 1, further comprising:
associating the first chatbot, the second chatbot, and one or more additional chatbots through the central messaging system to enable multi-party messaging involving three or more users.

14. The method of claim 1, in which at least one of the first chatbot and the second chatbot is configured to generate automated answers to user requests using natural language processing.

15. The method of claim 1, in which at least one of the first chatbot and the second chatbot is configured to generate automated answers to user requests using a public web interface or an interactive voice response (IVR) system.

16. A cross-platform messaging system comprising at least one processor and a memory storing processor-executable codes, wherein the at least one processor is configured to implement the following operations upon executing the processor-executable codes:
operatively coupling a first chatbot associated with a first user, wherein the first chatbot uses a neural network to recognize a request from the first user, a second chatbot associated with a second user, and a central messaging system;
receiving a message from the first chatbot, the first chatbot being associated with a first messaging application;
traversing an interactive voice response (IVR) system using the first chatbot;
determining, via the first chatbot, a menu structure of the IVR system using audio processing, the menu structure comprising selectable telephonic options for each level and selection of the menu structure, the first chatbot being configured to periodically initiate a call to the IVR system and update the menu structure;
storing the menu structure in a database;
receiving a request to establish a telecommunication session form the first messaging application on a client device, the request comprising a task;
determining, via natural language parsing, the task from the request;
creating, based on the determining the task, an instruction set;
executing, based on the instruction set, the task against the menu structure by the first chatbot entering the selectable telephonic options;
transmitting the message to the second chatbot, the second chatbot being associated with a second messaging application that is different from the first messaging application;
transmitting information relating to the first chatbot to the second chatbot to program the first chatbot;
transmitting information relating to the second chatbot to the first chatbot to program the second chatbot to enable the first user and the second user to send messages to one another via the first chatbot and the second chatbot;
automatically generating a response to the message from the first chatbot by the second chatbot without direct user instructions in real time;
wherein the response is indicative of availability of the second user based on each chatbot negotiating, using natural language processing, availability of users for a meeting on a particular date and time using a calendar application and using location and proximity systems of the users; and
transmitting the response by the second chatbot to the first chatbot for further presenting to the first user.

17. A non-transitory processor-readable medium having instructions stored thereon, which when executed by one or more processors, cause the one or more processors to implement a method for cross-platform messaging, the method comprising:

operatively coupling a first chatbot associated with a first user, wherein the first chatbot uses a neural network to recognize a request from the first user, a second chatbot associated with a second user, and a central messaging system;

receiving a message from the first chatbot, the first chatbot being associated with a first messaging application;

traversing an interactive voice response (IVR) system using the first chatbot;

determining, via the first chatbot, a menu structure of the IVR system using audio processing, the menu structure comprising selectable telephonic options for each level and selection of the menu structure, the first chatbot being configured to periodically initiate a call to the IVR system and update the menu structure;

storing the menu structure in a database;

receiving a request to establish a telecommunications session from the first messaging application on a client device, the request comprising a task;

determining, via natural language parsing, the task from the request;

creating, based on the determining the task, an instruction set;

executing, based on the instruction set, the task against the menu structure by the first chatbot entering the selectable telephonic options;

transmitting the message to the second chatbot, the second chatbot being associated with a second messaging application that is different from the first messaging application;

transmitting information relating to the first chatbot to the second chatbot to program the first chatbot;

transmitting information relating to the second chatbot to the first chatbot to program the second chatbot to enable the first user and the second user to send messages to one another via the first chatbot and the second chatbot;

automatically generating a response to the message form the first chatbot by the second chatbot without direct user instructions in real time;

wherein the response is indicative of availability of the second user based on each chatbot negotiating, using natural language processing, availability of users for a meeting on a particular data an time using a calendar application and using location and proximity systems of the users; and transmitting the response by the second chatbot to the first chatbot for further presenting to the first user.

\* \* \* \* \*